United States P

Tait et al.

3,738,734

June 12, 1973

[54] OPTICAL FLUID LENS CONSTRUCTION

[76] Inventors: Stuart S. Tait, 3 Marydons Crescent, Agincourt, Ontario; Thomas T. Reider, 47 Brahms Avenue, Willowdale, Ontario, both of Canada

[22] Filed: Feb. 23, 1972

[21] Appl. No.: 228,634

[52] U.S. Cl. .................................. 350/179, 353/122
[51] Int. Cl. .............................................. G02b 3/12
[58] Field of Search ............................. 350/179, 180

[56] References Cited
UNITED STATES PATENTS
1,780,773  11/1930  Wearham ..................... 350/179 UX
3,344,708  10/1967  Decker ......................... 350/180 X FOREIGN PATENTS OR APPLICATIONS
187,271  10/1922  Great Britain ..................... 350/180

Primary Examiner—John K. Corbin
Attorney—Peter W. McBurney and Donald F. Sim

[57] ABSTRACT

This invention provides a liquid-filled lens, which incorporates means for causing atmospheric pressure at least partly to counteract the internal pressure arising from the static pressure of the liquid head. This is accomplished generally by lowering the atmospheric equivalent level below the top of the chamber. Preferably, the latter is specifically carried out by making the chamber within the liquid lens air-tight except for an opening connected to an open-ended tube, the other end of the tube being immersed below the level of a liquid in a receptacle, the level of the liquid in the receptacle being below the top of the chamber, and preferably in the area between the bottom of the chamber and a point about one-third of the way between the bottom and the top of the chamber.

11 Claims, 13 Drawing Figures

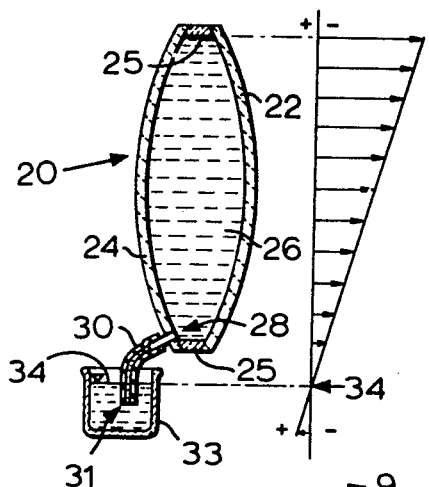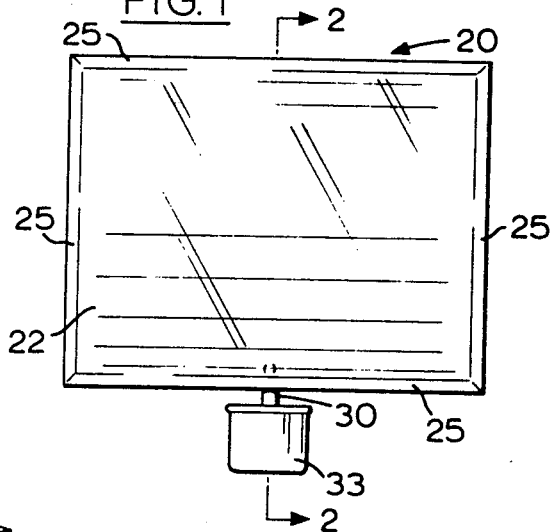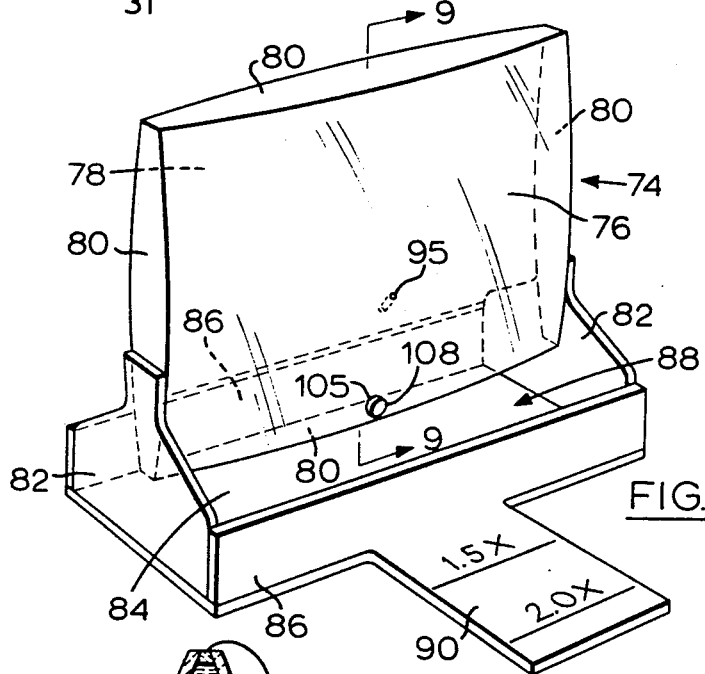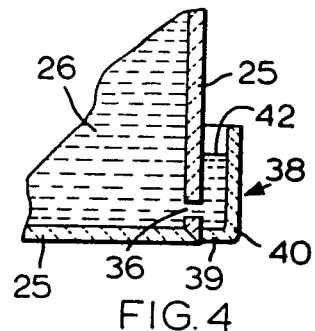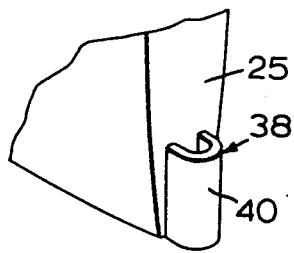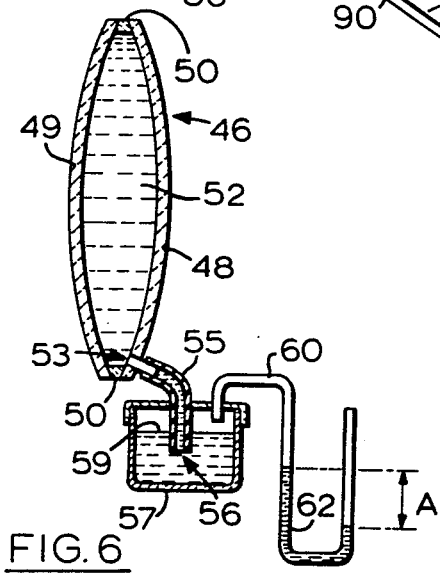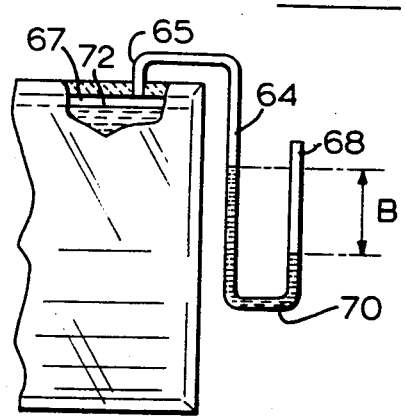

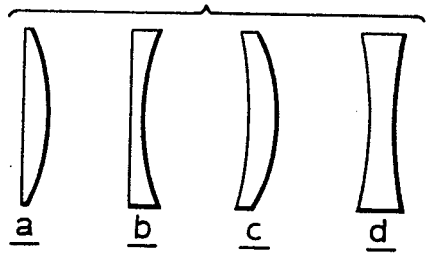
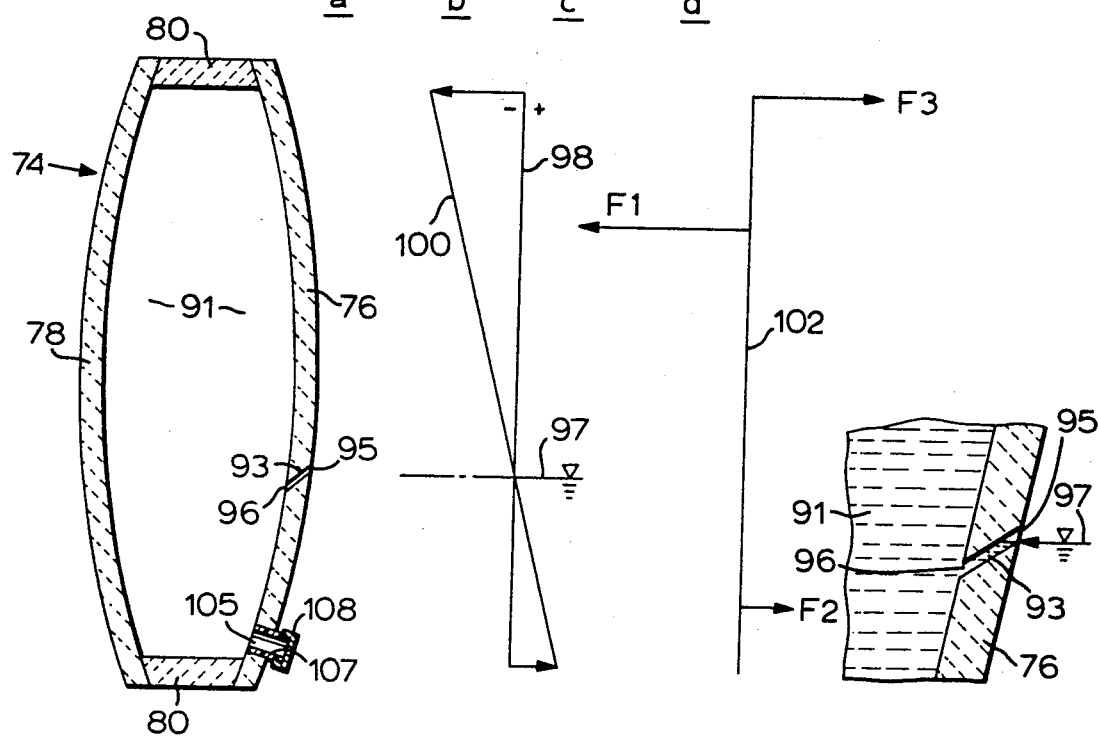
FIG.8     FIG.9     FIG.10     FIG.11     FIG.12
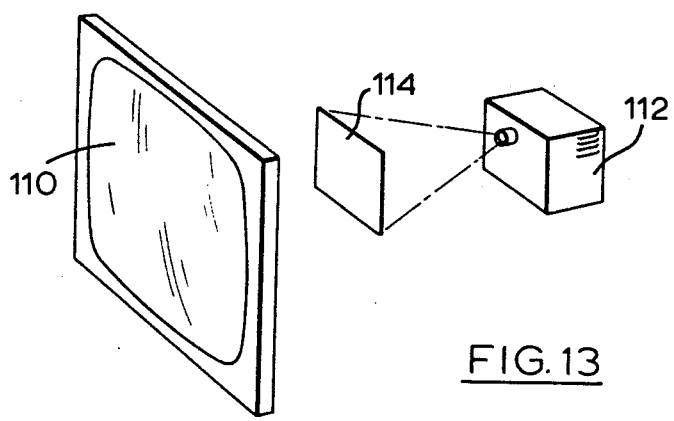
FIG.13

OPTICAL FLUID LENS CONSTRUCTION

This invention relates generally to lens-like optical devices, for magnifying or diminishing the apparent size of an object. More particularly, this invention has to do with the construction of a lens-like optical device which permits the manufacture of very large size lenses with diameters up to 8 or 10 feet.

GENERAL BACKGROUND OF THE INVENTION

Optical lenses are very well known and have been manufactured and used commercially for centuries. Early lenses were always made of glass, and required laborious grinding techniques in order to provide them with properly curved, optically smooth refraction surfaces. Because of the difficulties of the grinding techniques, the cost of manufacture of a ground-glass lens varies as the third or fourth power of its diameter, thus making lenses over one foot in diameter prohibitively costly for other than telescopic applications.

More recently, the smaller lenses have been manufactured from clear, colorless plastic material, usually by casting techniques utilizing molds with optically smooth surfaces. In solidifying within the mold, the plastic picks up the optically smooth characteristics for its refraction surfaces. Although this casting technique is relatively inexpensive as compared with ground-glass lenses, plastic, too, has certain characteristics which limit the size of the plastic lenses. These limitations have to do with the solidification of plastic within a mold. As plastic solidifies from the liquid to the solid state, it invariably undergoes contraction. Also, plastic cannot generally be cast in thicknesses greater than about two inches, because the plastic in the center of the thicker portions of the item will solidify last, causing the greatest amount of shrinkage at those thicker portions with the resultant distortion and stress in the item. Distortion, of course, must be absolutely eliminated in the manufacture of a lens, and this is why it has not been possible heretofore to cast a large-diameter lens of appreciable magnifying power. To give an example, a plastic double-convex lens of 2 foot diameter would require a center thickness of from 4 to 6 inches in order for its focal length to be reasonably short. (The exact focal length would depend, of course, upon the index of refraction of the plastic being used.) It would be extremely difficult, however, to cast a lens of this type from plastic by normal molding techniques, because the center portion of the lens would be distorted so greatly that the lens would be useless for magnification purposes.

Thus, the manufacture of large-diameter lenses from ground-glass has the disadvantage of prohibitive expense, while the use of plastic has the limitation of unavoidable distortion which present-day techniques have not been able to eliminate.

Even if it were possible to construct an optically true lens of, say, three foot diameter from either glass or plastic, it is obvious that the sheer weight of the material in such a lens (particularly if it were made of glass) would make it totally unsuited for applications requiring the lens to be put in place and removed with ease and facility. Furthermore, the additional weight of large-diameter lenses of this type would increase the costs of shipping and handling.

If it were possible to produce a low-cost, lightweight, large-diameter magnifying lens which could be set up and removed with ease and efficiency, it is not difficult to visualize a great multiplicity of uses for such a lens. Assuming that the lens is of the magnifying type (double-convex, or plano-convex), it would be very useful in school and university lecture rooms, permitting the teacher or professor to show prototypes, models and specimens to a large audience in true three-dimensional depth and at increased size. It would also be extremely useful in merchandising stores, particularly in display windows which up to now have been used only for large-size items, due to the fact that the public is usually kept from 4 to 8 feet away from the merchandise on display. With a large-diameter lens in the window, it would be possible to display a whole tray of jewelry, smaller items like cameras, pens, and so forth. The application of a large-diameter lens to the television industry is obvious. By purchasing a less-expensive small-tube portable television set and a large-diameter lens, the customer could use the television set as is for smaller rooms in which close-up viewing is enforced, and could magnify the television tube through the lens for viewing in larger rooms where the viewers are seated further away.

The point of departure for the present invention is a concept that has been known for over 100 years. It is to provide a chamber defined in part by two juxtaposed transparent walls configured to each other as the surfaces of a lens. The chamber is capable of holding a liquid such as water, and thus the interfaces between the water and the transparent walls function as the refraction surfaces of a lens. This prior art concept is fine in principle, but has certain serious disadvantages which will now be described.

DISADVANTAGES OF THE PRIOR ART

The use of a liquid within an upright chamber defined between two substantially vertical walls leads inevitably to certain problems relating to the static head of the liquid. For example, if a water-filled lens had a vertical height of 3 feet, the static pressure at the bottom of the column of liquid would be about 1.3 psig. This would result in a total outward pressure on each wall, taken over its full height, of about 23.4 pounds per lateral inch. Hence, if the lens were of square configuration, 36 inches on a side, the total outward pressure against each wall would be on the order of 840 pounds. This force would have to be contained at the edges of each wall, with the greatest portion of the load being borne along the bottom edge. As the head increases, the total load on each wall per lateral inch goes up also, the load varying as the square of the height. Thus, by doubling the height of the column of water, the load on each wall per lateral inch is quadrupled. If the lens were rectangular, and the same proportion of height to width were used for both the smaller and the larger lens, then the width of the lens would also double, and this would mean that the total load upon the lens would vary as the cube of the height. Thus, for a square lens 6 feet in width and height filled with water, the total outward load on each wall would be around 6,700 pounds, or better than 3 tons.

This tremendous outward force against the transparent walls of a vertically oriented lens would appear to stand in the way of manufacturing a water-filled lens with a vertical dimension greater than 3 or 4 feet.

OBJECTS OF THIS INVENTION

Accordingly, it is an object of this invention to provide a liquid-filled lens construction in which the outward pressure exerted against the transparent side walls by the liquid head is counteracted at least in part by atmospheric pressure acting inwardly.

An object of a preferred embodiment of this invention is to provide a combination of lens, screen and projector which permits the showing of slides and movie film to an audience without requiring the room to be darkened.

GENERAL DESCRIPTION OF THE INVENTION

Accordingly, this invention provides an optical device comprising two juxtaposed transparent walls defining between them a chamber capable of holding a liquid, each wall having optically smooth inner and outer surfaces, the inner surfaces of the walls being configured to each other as the surfaces of a lens, the optical device including means for decreasing the absolute pressure at the top of the chamber, thereby lowering the atmospheric equivalent level below the top of the chamber. Preferably, this means for decreasing pressure functions as a result of the pull of gravity. One construction for achieving this lowering of pressure involves providing aperture means for communicating the chamber with a location within a receptacle, which location is adapted to be submerged when the receptacle contains a given amount of liquid. The chamber is adapted to be sealed, apart from the aperture means, and the liquid-air interface in the receptacle (which defines the atmospheric equivalent level for the chamber) lies below the top of the chamber. By this provision, the atmospheric pressure is caused to press inwardly against the walls of the water-filled lens to counteract the pressure that is exerted by the head of water within the lens. If the atmospheric equivalent level is below the mid-plane of the walls, there results a net inward pressure against the walls. In the embodiment where the walls are convex outwardly (a double-convex lens), a net inward pressure is effectively resisted by the convex shape, for the same reason that it is so difficult to crush an egg with one's hand.

GENERAL DESCRIPTION OF THE DRAWINGS

Five embodiments of this invention are shown in the accompanying drawings, in which like numerals denote like parts throughout the several views, and in which:

FIG. 1 is an elevational view of the first embodiment of this invention;

FIG. 2 is a vertical sectional view taken at the line 2—2 in FIG. 1, including a pressure diagram;

FIG. 3 is a perspective view of the second embodiment of this invention;

FIG. 4 is a vertical sectional view of a portion of the third embodiment of this invention;

FIG. 5 is a perspective view of the embodiment illustrated in FIG. 4;

FIG. 6 is a vertical sectional view of the fourth embodiment of this invention;

FIG. 7 is an elevational view of a portion of a lens, showing the fifth embodiment of this invention;

FIG. 8 is a sectional view of alternate lens-shapes;

FIG. 9 is a vertical sectional view of the second embodiment of this invention, taken at the lines 9—9 in FIG. 3;

FIGS. 10 and 11 are force diagrams relating to the second embodiment of this invention;

FIG. 12 is a sectional view of a portion of FIG. 9, to a larger scale; and

FIG. 13 is an example of the use of this invention in a projection context.

DETAILED DESCRIPTION OF THE DRAWINGS:

Referring to FIGS. 1 and 2, a lens 20 includes a first transparent wall 22 and a second transparent wall 24. In the embodiment shown, each of the transparent walls 22 and 24 is of uniform thickness, although this is not essential to the invention. What is essential is that the inner and outer surfaces of each wall 22 and 24 be optically smooth, and that at least the inner surfaces of the walls 22 and 24 be configured to each other as the surfaces of a lens. In the embodiment shown, the lens is a double-convex lens, and for this reason each of the walls 22 and 24 is outwardly convex. Generally speaking, where a transparent wall is curved, it should approximate as closely as possible a spherical curvature. However, the lens could very easily be constructed as a plano-convex lens shown in FIG. 8a, a plano-concave lens as shown in FIG. 8b, a concavo-convex lens as shown in FIG. 8c, and a double-concave lens as shown in FIG. 8d. The first embodiment of this invention is considered to include all of the shapes illustrated in FIGS. 2 and 8, these being merely configurational variants of the first embodiment.

Preferably, the transparent walls are colorless although tinted walls would also fall within this invention.

The preferred material for the construction of the transparent walls 22 and 24 is an acrylic material generally known as "Plexiblas" (Reg. T.M.), although numerous other transparent rigid materials are available. This invention also encompasses the manufacture of the transparent walls 22 and 24 from glass.

In FIGS. 1 and 2, although the lens is of the double-convex type, the lens has been "trimmed" to a rectangular shape. Thus, the lens 20 shown in FIGS. 1 and 2 comprises, in addition to the first and second transparent walls 22 and 24, four double-tapered edge members 25 which span between the adjacent edges of the transparent walls 22 and 24.

As mentioned above, when the vertical dimension of a vertically oriented liquid-filled lens is large, the load per lateral inch of transparent wall goes up as the square of the height of the column of liquid, while the total load on a transparent wall (whose width dimension increases in proportion to the height dimension) varies as the cube of the height of the column of liquid. Thus, doubling all dimensions of a lens multiplies by eight the total load on each transparent wall. In the embodiment of FIGS. 1 and 2, the natural pressure of the atmosphere is made to counteract the pressure of the static head of liquid within the liquid-filled lens, and the construction by which this is provided will now be described in detail.

The chamber 26 defined between the transparent walls 22 and 24 is made air-tight, and the only access to the chamber 26 is through an aperture 28 which communicates through a tube 30 with a location 31 within a receptacle 33. The location 31 is such that it is adapted to be submerged when the receptacle 33 contains a given amount of liquid. In FIG. 2, it can be seen that the air-liquid interface 34 lies above the location 31.

Because the lower end of the tube 30 is submerged beneath the surface of liquid in the receptacle 33, and because the chamber 26 is air-tight except for the aperture 28, no air can enter the chamber 26. Furthermore, and more importantly, the static pressure over the entire column of liquid beginning at the interface 34 and going up through the tube 30 and up to the top of the chamber 26 is less than atmospheric pressure, the difference in pressure being greatest at the top and decreasing linearly down to the lever 34. However, the pressure of the atmosphere against the outside of each of the transparent walls 22 and 24 is constant at around 15 psi and since the pressure within the chamber 26 is at all points less than atmospheric pressure, the net pressure against each transparent wall 22 and 24 must be inwardly. Thus, the seals between the edge member 25 and the transparent walls 22 and 24 are urged together rather than apart.

Also, should any leak develop between the edge member 25 and the transparent walls 22 and 24, no liquid would leak out, but rather air would leak in. As the air leaked into the chamber 26, liquid would run out through the tube 30, and gradually fill the receptacle 33. If the receptacle 33 had sufficient capacity to accommodate all of the liquid contents of the chamber 26, or if the receptacle were in turn located within a larger container with that capacity, any risk of damage to surroundings through leakage of the liquid would be totally eliminated.

Throughout the remainder of this disclosure, and in the appended claims, the expression "atmospheric equivalent level" will be taken to mean the level in a standing column of liquid at which the pressure of the liquid is the same as that of atmosphere. In the FIG. 2 embodiment, the atmospheric equivalent level is the level of the air-liquid interface 34.

While water (fresh or salt) is the preferred liquid to be utilized in the chamber 16, because of its cheapness and ready availability, this invention also encompasses the use of other transparent liquids such as mineral oil. In certain applications, the use of other liquids has advantages over the use of water, because the indices of refraction of many liquids are greater than that of water (1.333), and because the densities of some of these are close to or less than the density of water. A higher index of refraction shortens the effective focal length of the lens, and this provides advantages which will be described in detail later in this disclosure. A liquid with lower density than that of water can be used to advantage in large lenses where a considerably volume of liquid is required to fill the lens. While it is preferably that the liquid employed be colorless as well as transparent, this is obviously not essential since a certain degree of tint may be permitted, or even desired in some instances. Naturally any liquid utilized must be one which does not attack the transparent walls 22 and 24 either chemically or physically.

Included in FIG. 2 at the right is a pressure diagram showing the decrease in static pressure in the tube 30 and in the chamber 26. The vertical line represents atmospheric pressure (about 15 psi), and arrows to the right and left of this line represent a decrease and increase, respectively, from atmospheric pressure. This has been indicated by plus and minus signals. The length of the arrows to the right in FIG. 4 can be taken to represent the degree of partial vacuum as compared with atmospheric pressure.

Attention is now directed to FIGS. 4 and 5, in which the second embodiment is shown. In FIG. 4, one of the edge members 25 is provided with an aperture 36 opening directly into the interior of a receptacle 38 defined by a bottom wall 39, a semi-cylindrical side wall 40 and the edge member 25 containing the aperture 36. It will be seen that the aperture 36 opens into the interior of the receptacle 38 at a location below the liquid-air interface 42, and this prevents air from entering the chamber 26 through the aperture 36. In FIG. 4, the location of the liquid-air interface 42 determines the atmospheric equivalent level for the second embodiment of the invention. It will be noted that a small portion of the chamber 26 lies below the liquid-air interface 42, and this will mean that the pressure in that portion will gradually increase in the downward direction. However, if the liquid-air interface 42 is maintained as close as possible to the bottom of the chamber 26, the net outward pressure on the portion of the transparent walls below the atmospheric equivalent level will be minimized. Also, by arranging the interface 42 to lie below the mid-point (vertically) of the transparent walls, the greater pressure of the atmosphere inwardly in the upper part of the transparent walls will effectively counteract the slightly greater than atmospheric pressure below the interface 42.

Attention is now directed to FIG. 6, in which the third embodiment of this invention is illustrated. In FIG. 6, a lens 46 includes first and second transparent walls 48 and 49, and four edge members 50 (of which only two are visible in FIG. 6). Thus, a central chamber 52 is defined between the transparent walls 28 and 49. As in the embodiment of FIG. 2, an aperture 53 communicates through a tube 55 with a location 56 within a receptacle 57. A liquid-gas interface 59 within the receptacle 57 is located above the location 56 at the bottom end of the tube 55.

The receptacle 57 is sealed against communication with the atmosphere, and an S-tube 60 opens through the upper portion of the receptacle 57, communicating therewith above the level of the liquid-gas interface 59. The S-tube 60 contains a liquid 62, such as mercury, and the liquid 62 is arranged such that there is a difference A in height between the two arms of the liquid, the higher arm being closest to the point at which the S-tube opens into the receptacle 57. The lower arm of the liquid 62 is open to the atmosphere through the other end of the S-tube 60.

If the height A were zero, then the pressure within the receptacle 57 above the liquid would be the same as the atmosphere, and the pressure profile of the variant shown in FIG. 6 would be the same as that for the embodiment of FIG. 2, with the atmospheric equivalent level being located at the liquid-gas interface 59. Where, however, the distance A is greater than zero, the air pressure above the liquid in the receptacle 57 will be less than atmospheric by the pressure equivalent of the height A. If the liquid in the chamber 52 and in the receptacle 57 is water, the atmospheric equivalent level for the chamber 52 will be lowered to a point below the interface 59, the distance below being the same as the height A. If the liquid is mercury, then the height A of mercury must be converted to the equivalent height of a column of water (which necessitates multiplying by approximately 13.6), and the atmospheric equivalent level will be found below the interface 59 by a distance equal to the equivalent height of the column of water.

The fourth embodiment of this invention is shown in FIG. 7, to which attention is now directed. In FIG. 7, an S-tube 64 has one end 55 communicating with the upper end of a chamber 67, and has its other end 68 open to the atmosphere. Mercury 70 (or any other suitable liquid) is contained in the lower portion of the S-tube 64, and the two arms of the mercury stand at different heights. The difference in height, B, determines the extent to which the pressure in the chamber 67 is reduced below atmospheric. The height B must first be converted to the equivalent height of a column of water (by multiplying the height B by approximately 13.6), and then the atmospheric equivalent level will be found below the liquid-gas interface 72 by a distance equal to the water-column equivalent of the height B. As mentioned above, provided the atmospheric equivalent level is located below the mid-point of the chamber 67, the net pressure on the transparent walls will be inwardly.

Attention is now directed to FIG. 3, which shows the fifth embodiment of this invention. In FIG. 3, a rectangular liquid-lens 74 includes a first transparent wall 76, a second transparent wall 78, and four edge member 80. The two side edge members are welded, glued or otherwise secured to two brace elements 82 which, together with a bottom panel 84 and two side panels 86, define a reservoir 88 positioned beneath the liquid-lens 74. The reservoir 88 has sufficient capacity to receive all of the liquid contained within the liquid-lens 74. The bottom panel 84 has an extension 90, extending generally perpendicularly away from the liquid-lens 74 about midway of its width. The extension 90 has inscribed upon it one or more lines which identify the location or locations at which an object must be positioned in order to achieve a given degree of magnification through the liquid-lens 74. As is well known in optics, the further away from a lens an object is held, the greater the magnification of that object. Naturally, a discernable, erect, magnified image is formed only when the object is maintained within the focal length of the lens.

The manner in which the atmospheric pressure is made to counteract the internal outward pressure of the liquid in the fifth embodiment will now be explained with reference to FIGS. 3, 9, 10, 11 and 12.

FIG. 9 is a vertical sectional view taken at the line 9—9 in FIG. 3 and shows, approximately one-third of the distance upwardly from the bottom of the internal chamber 91, an upwardly and outwardly sloping drill-hole 93 in wall 76. Thus, the drill-hole 93 has its outer end 95 in a higher plane than its inner end 96, when the liquid-lens 74 is upright, as shown in FIG. 9. When the chamber 91 is filled with water or any other liquid, the drill-hole 93 functions in exactly the same way as the receptacle 38 shown in FIGS. 4 and 5. As seen in FIG. 12, the water or other liquid inside the chamber 91 would rise up along the drill-hole 93 and fill it to the level marked with the number 97. The level 97 would thus mark the location of the atmospheric equivalent level for the lens 74, and it would result in the pressure diagram shown in FIG. 10. In FIG. 10, the vertical line 98 represents atmospheric pressure, and the oblique line 100 represents the pressure profile. Where the line 100 is to the left of the line 98, the pressure is less than atmospheric, and where the line 100 is to the right of the line 98, the pressure is greater than atmospheric. Where the two lines cross, the pressure inside and outside each wall 76 and 78 is the same, this being a point one third of the way between the bottom and the top of the chamber 91.

In FIG. 11, the triangles of pressure shown in FIG. 10 are resolved into forces acting at single points. The center of gravity of a triangle is located one-third of the way between the mid-point of a base and the opposite apex. In FIG. 11 the arrow marked F1 is a force vector representing the total force of the upper triangle in FIG. 10. The vector F1 is located one-third of the way between the top of the chamber 91 and the line 97. The vector marked F2 is located one third of the way between the bottom of the chamber 91 and the line 97, and has the opposite sense from that of the vector F1. The lengths of the vectors F1 and F2 are proportional to the area of the two triangles they represent, and for this reason F1 is four times as long as F2. In order to exactly balance the counter-clockwise torque on the wall 76 (represented by the vertical line 102 in FIG. 11), it is merely necessary to apply a force F3 at the top of the line 102, the length of the vector F3 being the difference between the length of the vectors F1 and F2. A calculation of the moments about any point along the line 102 will show that the line is in equilibrium. It will be noted that no force is required at the bottom of the line 102. This means that, by establishing the atmospheric equivalent level at a location one third of the way between the bottom and the top of the chamber 91, there is no net force one way or the other exerted by the lower end of the wall 76 on the edge member 80. In other words, the edge member 80 is neither in compression nor in tension in the horizontal direction parallel to the plane of the paper. Thus, the walls 76 and 78 compress the upper edge member 80, but exert no force whatever on the lower edge member 80. It will be understood, of course, that even though the walls 76 and 78 exert no pressure against the lower edge member 80, it is nonetheless true that the liquid adjacent the joint between the lower edge member 80 and the walls 76 and 78 will tend to leak outwardly if there is a break in the seal. Also, the foregoing discussion assumes that the walls 76 and 78 are absolutely rigid, which is not the case. All materials have some elasticity, and the degree of elasticity in the walls 76 and 78 will depend in some degree upon their thickness.

To fill the lens of this invention with liquid in such a way that the full static head of liquid is never allowed to exert its full force against the walls requires that the lens be laid substantially flat with its major dimension more or less horizontal. In the first embodiment (FIGS. 1 and 2) the filling can be done either through the aperture 28 (for example by removing the tube and using a funnel which permits the contained air to escape at the same time that the liquid is entering), or through a separate filling aperture (not shown). The only requirement is that the filling aperture, if separate from the aperture 28, be capable of achieving an air-tight seal. The filling aperture, if separate from the aperture 28, can be positioned in any convenient location on one of the transparent walls or edge members.

In the case where the aperture 28 is also used to fill the lens 20, the tube 30 is removed, the liquid is inserted through the aperture 28, at the same time the contained gas exits through the aperture 28, and then the tube 30 is reapplied so that it communicates with a submerged location in the receptacle 33. Then, the lens is rotated about its lower end to a vertical position as shown in FIG. 2, while the lower end of the tube 30 is maintained in a submerged condition. Throughout the operation of tilting the lens to an upright position as shown in FIG. 2, the pressure on the transparent walls will at all times be inwardly.

In order to fill the fifth embodiment of this invention, a special filling aperture 105 is provided at the bottom of the transparent wall 76. As seen in FIG. 9, the aperture 105 is defined by a sleeve 107 which projects outwardly from the wall 76 and is externally threaded on this projecting portion, and a threaded cap 108 adapted to seal the end of the sleeve 107. To fill the lens 74, the entire structure shown in FIG. 3 is rotated so that the upper end of the lens 74 rests against the ground and the extension 90 projects generally vertically upwardly. Then, the cap 108 is removed, and the chamber 91 is filled with liquid through the aperture 105. As liquid enters the chamber 91 through the aperture 105, the contained air can be exhausted through the drill-hole 93 (and also possibly through the aperture 105, depending upon the manner of filling).

FIG. 13 shows a particular combination of elements, including a liquid lens 110, which is useful for showing slides or movies to an audience without requiring the room to be darkened. A projector 112 is adapted to cast an image on a sheet 114 of what is known as rear-projection material. Rear-projection material is well-known, and consists usually of a sheet of clear, transparent plastic having one of its surfaces treated with a material forming a layer on which an image can be projected. The sheet is arranged with the treated side away from the projector. In FIG. 13, the sheet 114 of rear-projection material is located on the optical axis of the liquid lens 110 at the required distance to permit the liquid lens 110 to magnify the image presented by the sheet 114 of rear-projection material.

The reason why the configuration of FIG. 13 permits the showing of slides and movies without reducing the ambient light will now be explained.

If the projector 112 were merely to cast an image on a light-colored wall or on a conventional projection screen, a reduction of the intensity of the image in accordance with the well known inverse square law would take place. For example, supposing the projector 112 were to throw a square image on a projection screen, the image measuring 4 feet on a side. Thus the total area of the image would be 16 square feet, and it would have a certain brightness.

Now, if the same image were cast by the same projector 112 onto a piece of rear-projection material so as to form a smaller image measuring only 2 feet on a side (the image still being square), the apparent luminosity per unit area of the image would be approximately four times as much as the luminosity of the first-described image measuring 4 feet on a side. This is because the rear-projection material would be spaced from the projector at a distance equal to half of the distance between the projector and the original screen or wall. By placing a liquid lens 110 in front of the rear-projection material 114 as shown in FIG. 13, the distance between them being such that the image on the rear-projection material, as seen through the liquid lens 110, has twice its true linear dimension (four times the area), the image returns to its 4-foot square size, but its luminosity does not diminish in accordance with the inverse square rule. The reason for this is related to a well-known law of optics, according to which the intrinsic luminosity of an image remains substantially the same as that of the object, and is only diminished slightly due to the absorption taking place in the lens.

In other words, by creating a 4-foot square image through the lens 110 by using the combination shown in FIG. 13, the brightness of the image is approximately four times that of the same image if cast directly onto a wall or a projection screen by the projector 112 at the 4-foot square size.

In the carrying out of this invention, where water is replaced by another clear, transparent liquid having a higher index of refraction than water, it is possible to shorten the focal length of a given lens from what it would be with water. In optics, the shorter the focal length of a lens, for the same lens aperture, the greater the angle (from the optical axis) over which an image can be viewed. Thus, the "audience angle" of a given lens can be increased by using a liquid having a higher index of refraction than water.

What We Claim Is:

1. An optical device comprising two juxtaposed transparent walls defining between them a chamber holding a transparent liquid, each wall having optically smooth inner and outer surfaces, the inner surfaces of the walls being configured to each other as the surfaces of a lens, and means for decreasing the absolute pressure at the top of the chamber below atmospheric, whereby the atmospheric equivalent level is lowered a significant distance below the top of the chamber, said means including aperture means located below the top of said chamber for communicating the liquid of said chamber with a location within a receptacle, said location being submerged within the liquid in said receptacle, the chamber being sealed apart from said aperture means.

2. An optical device as claimed in claim 1, in which each transparent wall is colorless and has a substantially uniform thickness.

3. An optical device as claimed in claim 2, in which the said lens is a magnifying lens, the transparent walls being of clear plastic.

4. An optical device as claimed in claim 3, further including a piece of rear-projection material arranged on the optical axis of the device and spaced therefrom by a distance less than the focal length thereof.

5. An optical device as claimed in claim 2, in which the said lens is double-convex, each wall having a substantially spherical curvature.

6. An optical device as claimed in claim 1, in which the said means for decreasing functions as a result of the pull of gravity.

7. An optical device as claimed in claim 1, in which said receptacle is open to the atmosphere, the receptacle being adapted to be positioned such that, when the mid-plane between the walls is substantially vertical, the said location is submerged beneath an air-liquid interface in said receptacle, which interface is located on a level below the upper most part of the chamber.

8. An optical device as claimed in claim 1, in which the aperture means includes a tube communicating the chamber with said location, said receptacle being positioned such that the said location is submerged beneath and air-liquid interface in said receptacle, which interface is located on a level closer to the lowermost part of said chamber than to the uppermost part of said chamber, each wall being colorless and having a substantially uniform thickness, the said lens being a magnifying lens.

9. An optical device as claimed in claim 1, which device further includes reservoir means adapted to receive any overflow from said receptacle and any leaks from said chamber, the reservoir means having a capacity greater than the volume of said chamber, the device further including magnification indicating means for indicating the distance of an object from the lens at which a given degree of magnification of that object will take place.

10. An optical device comprising two juxtaposed transparent walls defining between them a chamber holding a transparent liquid, each wall having optically smooth inner and outer surfaces, the inner surfaces of the walls being configured to each other as the surfaces of a lens, and means for decreasing the absolute pressure at the top of the chamber below atmospheric, whereby the atmospheric equivalent level is lowered a significant distance below the top of the chamber, said means including aperture means located below the top of said chamber for communicating the liquid of said chamber with a location within a receptacle, said location being submerged within the liquid in said receptacle, the chamber being sealed apart from said aperture means, a drill-hole in one wall below the top of the chamber, the outer end of the drill-hole lying wholly above the inner end thereof when the optical device is oriented with the walls substantially vertical, the atmospheric equivalent level being located vertically between the outer and inner ends of said drill-hole.

11. An optical device as claimed in claim 10, in which the drill-hole is located about one-third of the way from the bottom to the top of the chamber.

* * * * *